(12) United States Patent  
Parthasarathy et al.

(10) Patent No.: US 8,464,074 B1  
(45) Date of Patent: Jun. 11, 2013

(54) STORAGE MEDIA ENCRYPTION WITH WRITE ACCELERATION

(75) Inventors: Anand Parthasarathy, Fremont, CA (US); Chandra Sekhar Kondamuri, Santa Clara, CA (US); Ramkumar Chinchani, San Jose, CA (US); Gian Carlo Boffa, San Ramon, CA (US); Maurilio Cometto, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 12/434,477

(22) Filed: May 1, 2009

Related U.S. Application Data

(60) Provisional application No. 61/057,712, filed on May 30, 2008.

(51) Int. Cl.
*G06F 11/30* (2006.01)
*H04L 12/50* (2006.01)
*H04K 1/00* (2006.01)
*G06F 15/167* (2006.01)

(52) U.S. Cl.
USPC .............. 713/193; 370/386; 380/28; 709/213

(58) Field of Classification Search
USPC ........................................................ 713/193
See application file for complete search history.

(56) References Cited

U.S. PATENT DOCUMENTS

| | | | |
|---|---|---|---|
| 4,423,480 A | 12/1983 | Bauer et al. | |
| 4,435,762 A | 3/1984 | Milligan et al. | |
| 4,932,826 A | 6/1990 | Moy et al. | |
| 5,016,277 A | 5/1991 | Hamilton | |
| 5,347,648 A | 9/1994 | Stamm et al. | |
| 5,692,124 A | 11/1997 | Holden et al. | |
| 5,754,658 A * | 5/1998 | Aucsmith | 380/28 |
| 5,758,151 A | 5/1998 | Milligan et al. | |
| 5,765,213 A | 6/1998 | Ofer | |
| 5,809,328 A | 9/1998 | Nogales et al. | |
| 5,842,040 A | 11/1998 | Hughes et al. | |
| 5,892,915 A | 4/1999 | Duso et al. | |
| 5,930,344 A | 7/1999 | Relyea et al. | |
| 6,026,468 A | 2/2000 | Mase et al. | |
| 6,049,546 A | 4/2000 | Ramakrishnan | |
| 6,070,200 A | 5/2000 | Gates et al. | |
| 6,141,728 A | 10/2000 | Simionescu et al. | |

(Continued)

OTHER PUBLICATIONS

U.S. Appl. No. 11/015,383, filed Dec. 15, 2004.

(Continued)

*Primary Examiner* — Evans Desrosiers
(74) *Attorney, Agent, or Firm* — Weaver Austin Villeneuve & Sampson LLP

(57) ABSTRACT

Methods and apparatus for performing Storage Media Encryption (SME) are disclosed. In one embodiment, an apparatus includes a memory and a plurality of processors. The apparatus receives a write command from a network device. The apparatus sends a transfer ready to the network device in response to the write command. The apparatus receives data from the network device. The apparatus composes a status and sends the status the network device. The status is sent to the network device after the data has been received from the network device and prior to both compressing and encrypting the data. The apparatus compresses the data to generate compressed data. One of the plurality of processors encrypts the compressed data to generate modified data. The apparatus then sends the modified data to a target indicated by the write command.

26 Claims, 8 Drawing Sheets

U.S. PATENT DOCUMENTS

| | | | |
|---|---|---|---|
| 6,148,421 | A | 11/2000 | Hoese et al. |
| 6,172,520 | B1 | 1/2001 | Lawman et al. |
| 6,178,244 | B1 | 1/2001 | Takeda et al. |
| 6,219,728 | B1 | 4/2001 | Yin |
| 6,317,819 | B1 | 11/2001 | Morton |
| 6,327,253 | B1 | 12/2001 | Frink |
| 6,381,665 | B2 | 4/2002 | Pawlowski |
| 6,449,697 | B1 | 9/2002 | Beardsley et al. |
| 6,507,893 | B2 | 1/2003 | Dawkins et al. |
| 6,570,848 | B1 | 5/2003 | Loughran et al. |
| 6,625,750 | B1 | 9/2003 | Duso et al. |
| 6,633,548 | B2 | 10/2003 | Bachmutsky |
| 6,651,162 | B1 | 11/2003 | Levitan et al. |
| 6,658,540 | B1 | 12/2003 | Sicola et al. |
| 6,751,758 | B1 | 6/2004 | Alipui et al. |
| 6,757,767 | B1 | 6/2004 | Kelleher |
| 6,775,749 | B1 | 8/2004 | Mudgett et al. |
| 6,782,473 | B1 | 8/2004 | Park |
| 6,788,680 | B1 | 9/2004 | Perlman et al. |
| 6,791,989 | B1 | 9/2004 | Steinmetz et al. |
| 6,880,062 | B1 | 4/2005 | Ibrahim et al. |
| 6,941,429 | B1 | 9/2005 | Kamvysselis et al. |
| 7,000,025 | B1 | 2/2006 | Wilson |
| 7,065,582 | B1 | 6/2006 | Dwork et al. |
| 7,165,180 | B1 | 1/2007 | Ducharme |
| 7,181,578 | B1 | 2/2007 | Guha et al. |
| 7,185,062 | B2 | 2/2007 | Lolayekar et al. |
| 7,219,158 | B2 | 5/2007 | Border |
| 7,219,237 | B1 | 5/2007 | Trimberger |
| 7,237,045 | B2 | 6/2007 | Beckmann et al. |
| 7,286,476 | B2 | 10/2007 | Helmy et al. |
| 7,295,519 | B2 | 11/2007 | Sandy et al. |
| 7,389,462 | B1 | 6/2008 | Wang et al. |
| 7,397,764 | B2 | 7/2008 | Cherian et al. |
| 7,411,958 | B2 | 8/2008 | Dropps et al. |
| 7,414,973 | B2 | 8/2008 | Hart et al. |
| 7,415,574 | B2 | 8/2008 | Rao et al. |
| 7,436,773 | B2 | 10/2008 | Cunningham |
| 7,472,231 | B1 | 12/2008 | Cihla et al. |
| 7,568,067 | B1 | 7/2009 | Mase et al. |
| 7,583,597 | B2 | 9/2009 | Dropps et al. |
| 7,617,365 | B2 | 11/2009 | Zhang et al. |
| 7,890,655 | B2 | 2/2011 | Chandrasekaran |
| 8,266,431 | B2 | 9/2012 | Parlan et al. |
| 2001/0016878 | A1 | 8/2001 | Yamanaka |
| 2002/0024970 | A1 | 2/2002 | Amaral et al. |
| 2002/0059439 | A1 | 5/2002 | Arroyo et al. |
| 2002/0124007 | A1* | 9/2002 | Zhao .................. 707/102 |
| 2002/0169521 | A1 | 11/2002 | Goodman et al. |
| 2003/0021417 | A1 | 1/2003 | Vasic et al. |
| 2003/0065882 | A1 | 4/2003 | Beeston et al. |
| 2003/0084209 | A1 | 5/2003 | Chadalapaka |
| 2003/0093567 | A1 | 5/2003 | Lolayekar et al. |
| 2003/0185154 | A1 | 10/2003 | Mullendore et al. |
| 2004/0010660 | A1 | 1/2004 | Konshak et al. |
| 2004/0049564 | A1 | 3/2004 | Ng et al. |
| 2004/0081082 | A1 | 4/2004 | Moody, II et al. |
| 2004/0088574 | A1 | 5/2004 | Walter et al. |
| 2004/0148376 | A1 | 7/2004 | Rangan et al. |
| 2004/0153566 | A1 | 8/2004 | Lalsangi et al. |
| 2004/0158668 | A1 | 8/2004 | Golasky et al. |
| 2004/0160903 | A1 | 8/2004 | Gai et al. |
| 2004/0170432 | A1 | 9/2004 | Reynolds et al. |
| 2004/0202073 | A1 | 10/2004 | Lai et al. |
| 2005/0021949 | A1 | 1/2005 | Izawa et al. |
| 2005/0031126 | A1 | 2/2005 | Edney et al. |
| 2005/0114663 | A1 | 5/2005 | Cornell et al. |
| 2005/0117522 | A1 | 6/2005 | Basavaiah et al. |
| 2005/0144394 | A1 | 6/2005 | Komaria et al. |
| 2005/0192923 | A1 | 9/2005 | Nakatsuka |
| 2006/0018293 | A1* | 1/2006 | Farley et al. .................. 370/337 |
| 2006/0036821 | A1 | 2/2006 | Frey et al. |
| 2006/0039370 | A1 | 2/2006 | Rosen et al. |
| 2006/0059313 | A1 | 3/2006 | Lange |
| 2006/0059336 | A1 | 3/2006 | Miller et al. |
| 2006/0104269 | A1 | 5/2006 | Perozo et al. |
| 2006/0112149 | A1 | 5/2006 | Kan et al. |
| 2006/0126520 | A1 | 6/2006 | Nambiar et al. |
| 2006/0214766 | A1* | 9/2006 | Ghabra et al. ................ 340/5.25 |
| 2006/0248278 | A1 | 11/2006 | Beeston et al. |
| 2006/0262784 | A1 | 11/2006 | Cheethirala et al. |
| 2007/0088795 | A1 | 4/2007 | Dunbar |
| 2007/0101134 | A1 | 5/2007 | Parlan et al. |
| 2007/0115966 | A1 | 5/2007 | Tzeng |

OTHER PUBLICATIONS

U.S. Final Office Action dated Oct. 16, 2009 from U.S. Appl. No. 11/015,383.
U.S. Office Action dated Sep. 3, 2009 from related U.S. Appl. No. 11/220,490.
U.S. Final Office Action dated Mar. 3, 2010 from related U.S. Appl. No. 11/220,490.
U.S. Final Office Action dated Sep. 9, 2009 from U.S. Appl. No. 11/264,191.
U.S. Office Action dated Jan. 25, 2010 from U.S. Appl. No. 11/264,191.
Austin Modine, "HP adds Encryption Gear for Storage Systems, Tape and Virtual Tape get Algorithmic," The Register, printed on Apr. 28, 2009 from URL: http://www.theregister.co.uk/2008/04/04/hp_storage_encryption_add_ons/, 2 pgs.
Cisco MDS 9000 Intelligent Fabric Applications, "Fibre Channel Write Acceleration" printed on Apr. 28, 2009 from website: http://www.cisco.com/en/US/prod/collateral/ps4159/ps6409/ps5989/ps6217/prod_white_paper, 7 pgs.
StorageTek: The Leader in Information Lifecycle Management Solutions, http://www.storagetek.com, printed Aug. 4, 2005, p. 1.
"Affordable Remote Tape Backup/Restore via Tape Pipelining Over IP", CNT White Paper, pp. 1-8.
Forouzan et al., "TCP/IP Protocol Suite", 2002, McGraw-Hill Professional, Second Edition, Section 12.4, pp. 305-308.
Viega J. et al., Network Working Group, "The use of Galois/Counter mode (GMC) in Ipsec Encapsulating Security Payload (ESP)," RFC 4106, Secure Software, Inc., Jun. 2005, 16 pgs.
U.S. Appl. No. 11/220,490, filed Sep. 6, 2005, 30 pgs.
U.S. Office Action dated Nov. 15, 2007 from related U.S. Appl. No. 11/220,490, 14 pgs.
ISR and Written Opinion dated Mar. 26, 2008 from related PCT Application No. PCT/US06/42477, 7 pgs.
U.S. Office Action dated May 28, 2008 from related U.S. Appl. No. 11/220,490, 22 pgs.
U.S. Office Action dated Dec. 5, 2008 from related U.S. Appl. No. 11/220,490, 17 pgs.
U.S. Office Action dated Mar. 18, 2009 from related U.S. Appl. No. 11/264,191, 13 pgs.
U.S. Final Office Action dated Mar. 24, 2009 from related U.S. Appl. No. 11/220,490, 19 pgs.
U.S. Office Action dated Apr. 2, 2009 from U.S. Appl. No. 11/015,383, 16 pgs.
CN First Office Action dated Jan. 26, 2011, from CN Appl. No. 200680023522.7.
CN Second Office Action dated Aug. 2, 2011, from CN Appl. No. 200680023522.7.
U.S. Non-Final Office Action dated Aug. 24, 2010, from U.S. Appl. No. 11/015,383.
U.S. Final Office Action dated Dec. 23, 2010, U.S. Appl. No. 11/015,383.
U.S. Non-Final Office Action dated May 6, 2011 from U.S. Appl. No. 11/015,383.
U.S. Final Office Action dated Sep. 14, 2011 from U.S. Appl. No. 11/015,383.
U.S. Notice of Allowance dated Jul. 27, 2010 from related U.S. Appl. No. 11/220,490.
U.S. Notice of Allowance dated Feb. 2, 2011 from related U.S. Appl. No. 11/220,490.
U.S. Notice of Allowance dated May 19, 2011 from related U.S. Appl. No. 11/220,490.
U.S. Notice of Allowance dated Sep. 29, 2011 from related U.S. Appl. No. 11/220,490.
U.S. Final Office Action dated Jul. 26, 2010 from U.S. Appl. No. 11/264,191.

U.S. Office Action dated Mar. 4, 2011 from U.S. Appl. No. 11/264,191.
U.S. Final Office Action dated Aug. 31, 2011 from U.S. Appl. No. 11/264,191.
U.S. Office Action dated Aug. 7, 2008 from U.S. Appl. No. 11/356,881.
U.S. Final Office Action dated Nov. 14, 2008 from U.S. Appl. No. 11/356,881.
U.S. Office Action dated May 8, 2009 from U.S. Appl. No. 11/356,881.
U.S. Final Office Action dated Nov. 9, 2009 from U.S. Appl. No. 11/356,881.
U.S. Office Action dated Jun. 3, 2010 from U.S. Appl. No. 11/356,881.
U.S. Notice of Allowance dated Oct. 14, 2010 from U.S. Appl. No. 11/356,881.
Notice of Allowance dated May 3, 2012, U.S. Appl. No. 11/264,191.

* cited by examiner

| Task N    | ... | Task 3      | Task 2   | Task 1      |
|-----------|-----|-------------|----------|-------------|
| Status 602|     | Pending 602 | Done 602 | Pending 602 |

FIG. 6

STORAGE MEDIA ENCRYPTION WITH WRITE ACCELERATION

RELATED APPLICATIONS

This application claims priority from Provisional Application No. 61/057,712, entitled, "Storage Media Encryption with Write Acceleration," filed on May 30, 2008, by Parthasarathy et al, which is incorporated herein by reference for all purposes.

BACKGROUND

1. Technical Field

The present disclosure relates generally to methods and apparatus for performing compression and/or encryption of data that is being transmitted to storage media in association with a write command.

2. Description of the Related Art

Storage Media Encryption (SME) generally refers to the encryption of data prior the storage of the data to various storage media, which may be referred to as "targets." SME may also involve compression of data prior to its encryption, as well as other processes. An SME device in the network may perform SME in association with a write command received from a host. Unfortunately, substantial delays are introduced as a result of the SME process.

BRIEF DESCRIPTION OF THE DRAWINGS

FIG. 6 is a block diagram illustrating an example data structure that may be used to track the status of tasks being processed by a plurality of processors in accordance with various embodiments.

DESCRIPTION OF EXAMPLE EMBODIMENTS

Figure 1:
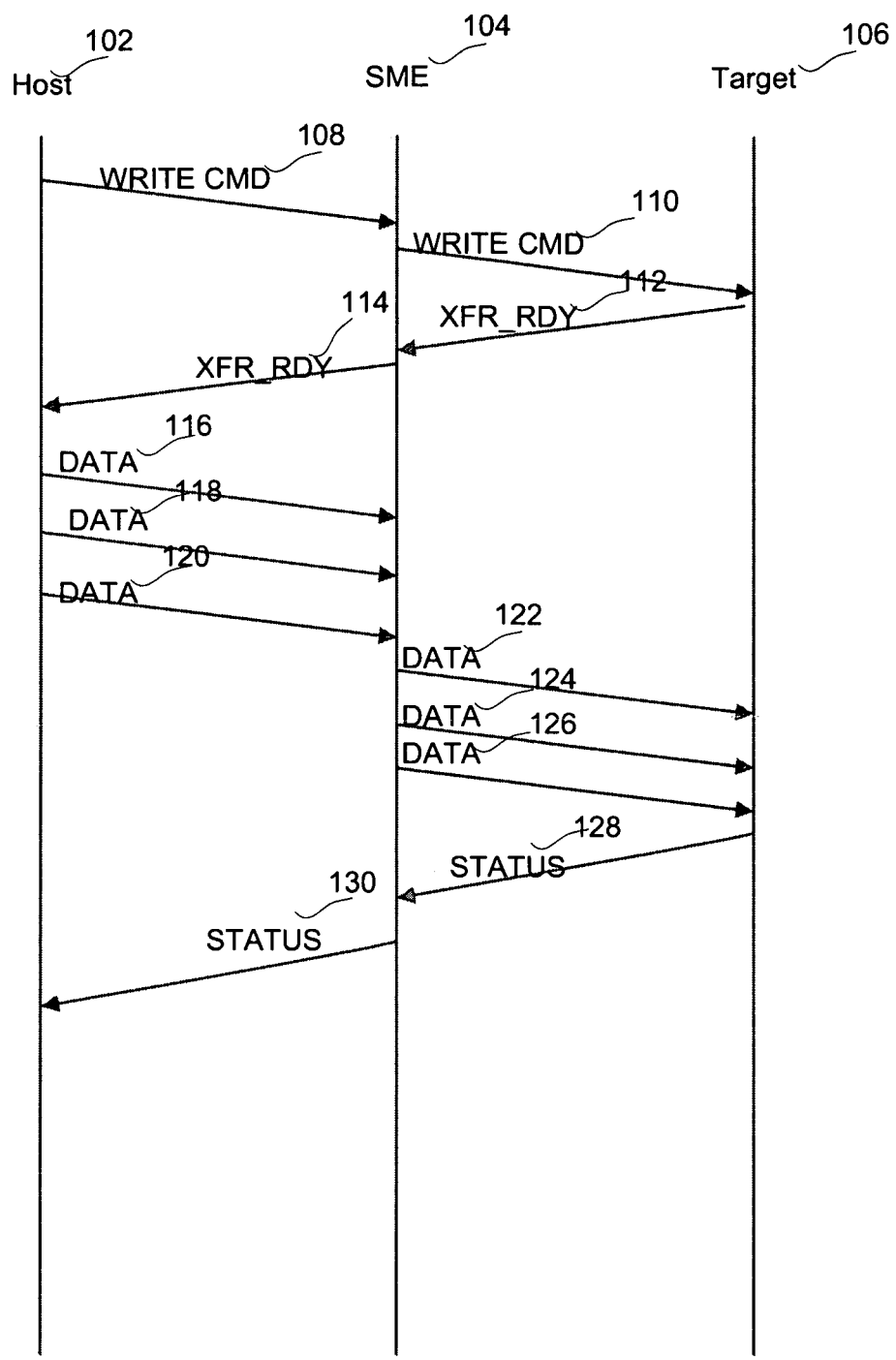
FIG. 1 is a transaction flow diagram illustrating a method of performing a SCSI write operation without performing compression or encryption.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, an apparatus includes a memory and a plurality of processors. The apparatus receives a write command from a network device. The apparatus sends a transfer ready to the network device in response to the write command. The apparatus receives data from the network device. The apparatus composes a status and sends the status the network device. The status is sent to the network device after the data has been received from the network device and prior to both compressing and encrypting the data. The apparatus compresses the data to generate compressed data. One of the plurality of processors encrypts the compressed data to generate modified data. The apparatus then sends the modified data to a target indicated by the write command.

Specific Example Embodiments

The disclosed embodiments relate to storage media, including but not limited to tape, as well as to compression and/or encryption of data that is transmitted to the storage media (i.e., targets). Encryption of data prior to being stored to storage media may be referred to as storage media encryption ("SME"). SME may also involve compression of data prior to its encryption, as well as other processes.

It has been observed that SME write input/output ("I/O") performance for a single tape flow drops by approximately 50% when compared to the throughput of the host that is initiating the I/O (e.g., write commands). Various noticeable latencies may be introduced by SME itself, as a result of processes such as the following: encryption and integrity digest; compression; buffering latency for the complete tape block; and cyclic redundancy check ("CRC") verification/calculation. All of these latencies can contribute to significant delay and decrease the effective host throughput.

Tapes are sequential devices and typically support only one outstanding I/O command. A new I/O may be originated by the host after the status for the previous I/O is received by the host. In the case of tapes, each Read/Write I/O may represent a logical block in the tape medium.

Some SME processes may involve, for example, the Advanced Encryption Standard ("AES"), Galois/Counter Mode ("GCM") or other encryption and/or authentication processes. With SME, compression and encryption may be applied for the entire logical block, as compression is effective across a large-sized logical block and encryption can protect each distinct logical block (e.g., using a separate Initialization Vector (IV)).

If compression and encryption are applied for the entire logical block, an SME process may, for example, involve the following: buffering all the data frames corresponding to a single I/O; applying a compression transform followed by an encryption transform; and segmenting (and re-computing a cyclic redundancy check value (CRC) for) the resultant logical block into multiple data frames. Unfortunately, the target does not send a status until it receives all of the data frames. As a result, the host that has sent a write command will perceive a substantial delay between the time it sends the data and the time it receives a status.

Various embodiments for performing an "accelerated write" to reduce this delay and increase the efficiency with which data may be written to storage media are disclosed. In order to illustrate the advantages of the disclosed embodiments, prior art methods for performing SME are described with reference to FIGS. 1 and 2. Embodiments for performing SME will be described in further detail below with reference to FIGS. 3-8.

In the following description, the term SME device may refer to a network device that implements SME. For example, the network device may be a router or switch. More specifically, the SME device may include one or more line cards, where at least one of the line cards implements SME.

The disclosed embodiments provide hardware (such as network devices and components of network devices) that may be configured to perform the methods of the invention, as well as software to control devices to perform these methods. For example, some processes may be performed by a logic system that includes one or more logic devices (such as processors, programmable logic devices, etc.), associated memory devices, etc. An SME device, for example, may be implemented by one or more such logic devices and associated memory.

FIG. 1 is a transaction flow diagram illustrating a prior art method of performing a Small Computer System Interface (SCSI) write operation without performing compression or encryption. Steps performed by a host, SME device, and target will be described with reference to vertical lines 102, 104, and 106, respectively. The host 102 sends a write command (WRITE_CMD) at 108 to the SME device 104, which then sends the write command at 110 to the target 106. A write command typically indicates the amount of data to be written to a target. The target 106 sends a transfer ready (XFR_RDY) at 112 to the SME device 104 indicating that it is ready to receive data. The SME device 104 then sends a transfer ready at 114 to the host 102. The host sends the data at 116, 118, 120 to the SME device 104, which then sends the data at 122, 124, 126 to the target 106. The target 106 then sends a status at 128 to the SME device 104 indicating whether the data was received successfully. The SME device 104 then sends the status at 130 to the host 102. Since the data is neither compressed nor encrypted in this example, the host 102 does not perceive a delay between the time it sends the data and the time it receives the status.

Figure 2:
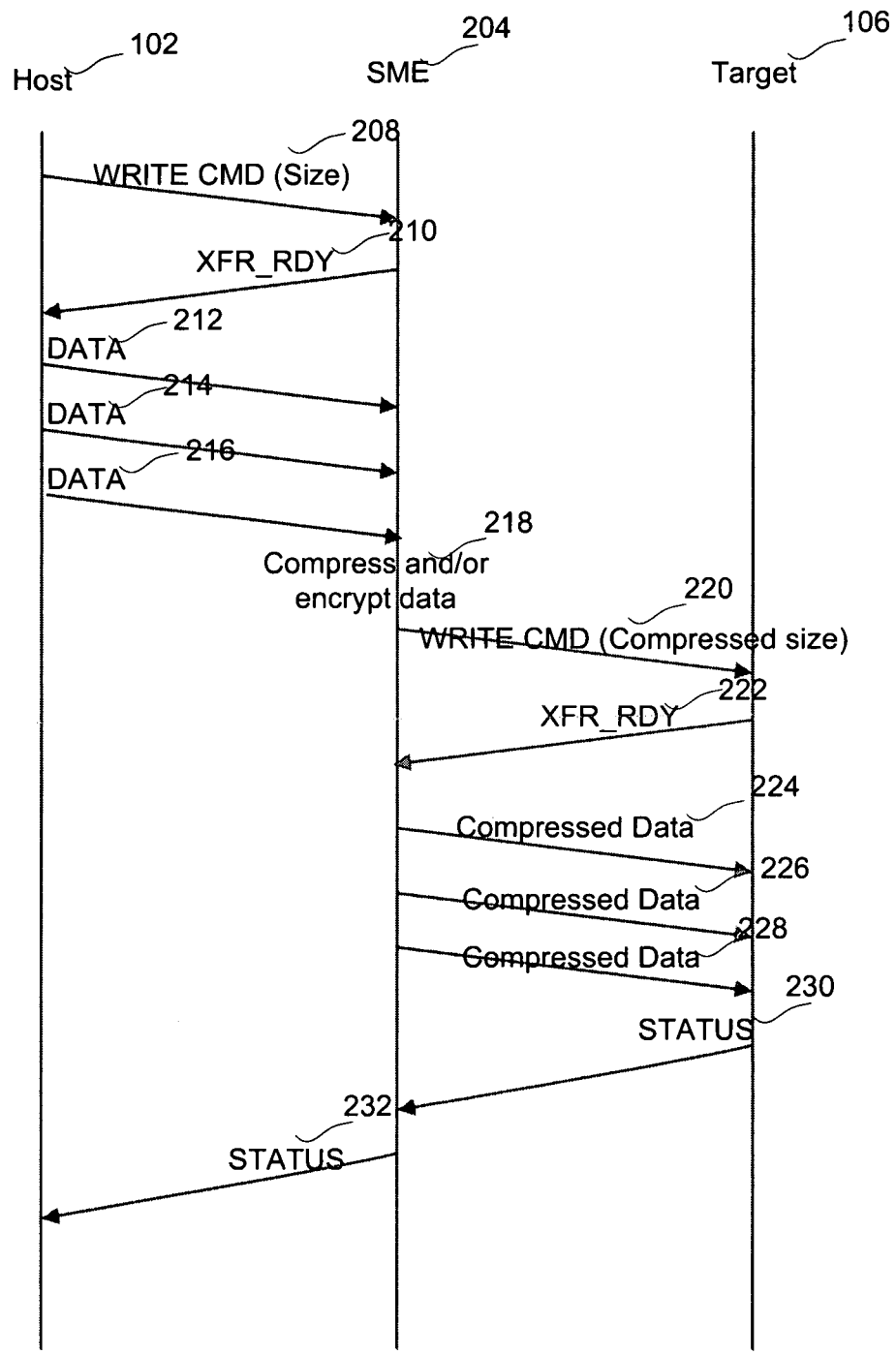
FIG. 2 is a transaction flow diagram illustrating a prior art method of performing a SCSI write operation with compression and encryption.

FIG. 2 is a transaction flow diagram illustrating a prior art method of performing a SCSI write operation with compression and encryption. In this example, SME device 204 performs compression of the data and/or encryption of the data (e.g., compressed or uncompressed data). When the host 102 sends a write command (WRITE_CMD) at 208 to the SME device 204, the write command specifies the amount (i.e, size) of the data to be written to the target 106. The SME device 204 composes and sends a transfer ready (XFR_RDY) at 210 to the host 102 to indicate that the SME device 204 is ready to receive a transfer of data. The host 102 then sends the data to the SME device 204 at 212, 214, 216. The SME device 204 may then compress and encrypt the data at 218. Compression and encryption can each be processing intensive tasks, and therefore can introduce a substantial delay. Upon compression of the data, the size of the data to be written to the target will be smaller than the size of the data prior to compression. Thus, the SME device 204 sends a write command that includes the compressed size at 220 to the target 106. The target 106 then sends a transfer ready (XFR_RDY) at 222 to the SME device 204. The SME device 204 sends the compressed data at 224, 226, 228 to the target 106. The target 106 sends a status at 230 to the SME device 204, where the status indicates whether the data has been successfully written to the target 106. The SME device 204 then sends the status at 232 to the host 102. After receiving the status indicating that the write was successful, the host 102 may send additional write commands. Unfortunately, the host 102 in this instance will perceive a significant delay between the time that the host 102 sends the data and the time that the host 102 receives the status.

As described with reference to FIG. 2, the host 102 will typically not proceed with sending additional write commands until it has received a status indicating that a previous write was successful. Moreover, a substantial delay is introduced when the data being written is compressed and/or encrypted. The disclosed embodiments enable data to be written in a more efficient manner by eliminating the delays perceived by a host sending write commands, as will be described in further detail below with reference to FIGS. 3-7.

Figure 3:
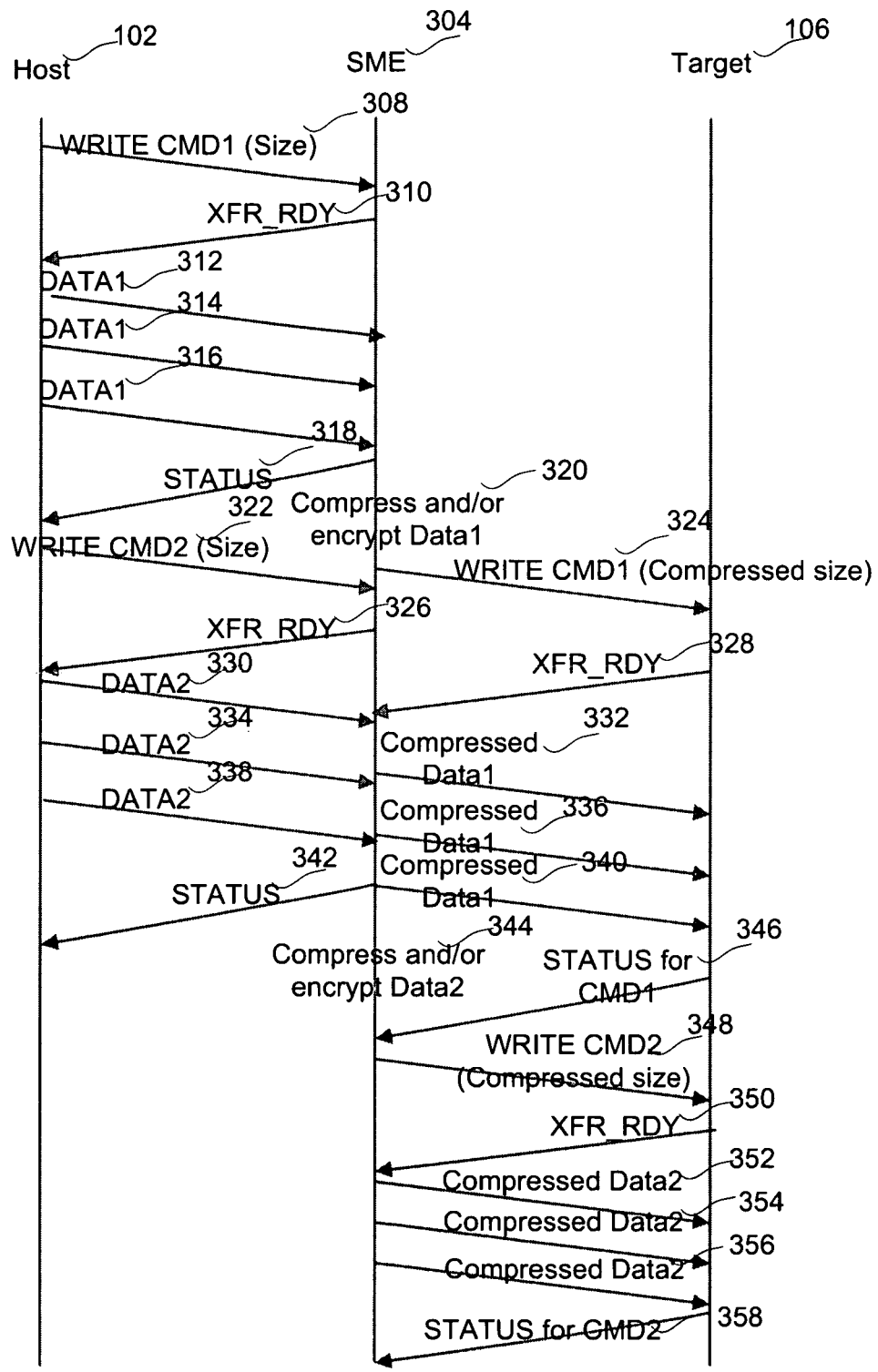
FIG. 3 is a transaction flow diagram illustrating an example method of performing a SCSI write operation with compression and encryption with write acceleration in accordance with various embodiments.

FIG. 3 is a transaction flow diagram illustrating an example method of performing a SCSI "accelerated write" operation with compression and encryption in accordance with various embodiments. In this example, SME device 304 performs compression of the data and/or encryption of the data (e.g., compressed or uncompressed data). In order to illustrate the advantages that may be achieved via the disclosed embodiments, the host 102 in this example sends multiple, consecutive write commands.

When the host 102 sends a first write command (WRITE_CMD1) at 308 to the SME device 304, the write command may specify the amount (i.e, size) of the data to be written to the target 106. The SME device 304 may compose and send a transfer ready (XFR_RDY) at 310 to the host 102 to indicate that the SME device 304 is ready to receive a transfer of data. The host 102 may then send the data to the SME device 304 at 312, 314, 316. Rather than waiting to receive a status from the target 106, the SME 304 may compose and send a status to the host 102 as shown at 318 after the data has been received. Although the data (or compressed data) has not been written to the target 106 and therefore a status has not yet been received from the target 106, the status sent to the host 102 may indicate that the write has been successful. Specifically, the status may be sent to the host 102 prior to completion of the compression and/or encryption of the data (Data1) at 320. More particularly, the status may be sent to the host 102 prior to initiating compression and/or encryption of the data.

As will be described in further detail below, the data compression and/or encryption processing may be distributed to different logic devices, e.g., to processors or co-processors (such as Octeon™ co-processors). In some such examples, since the host has received the status message (or the like), the host may send subsequent write commands while the compression, encryption and/or target side processing occur in parallel.

For example, once the host 102 receives the status, the host 102 may send another write command, WRITE_CMD2, as shown at 322. Thus, the host does not experience any delay as a result of the compression and/or encryption of the data transmitted in association with the first write command.

After the SME device 304 has compressed and/or encrypted the data, Data1, transmitted in association with the first write command at 320, the SME device 304 continues to send a write command, WRITE_CMD1, to the target 106 as shown at 324. Since the data has been compressed, the size of the data transmitted (specified as a parameter to the write command) will be smaller than that specified by the host in the write command sent by the host at 308.

The SME device 304 may send a transfer ready, XFR_RDY, to the host 102 at 326 in response to the second write command. The host 102 may then send the data, Data2, to the SME at 332, 334, 338 in association with the second write command. The SME device 304 may then send a status at 342 to the host 102 in association with the second write command. Although not shown in this example, the host 102 may continue to send write commands to the SME device 304.

While the host 102 proceeds to send the data, Data2, at 332, 334, 338 in association with the second write command, the SME device 304 may receive a transfer ready, XFR_RDY, from the target 106 in association with the first write command, as shown at 328. Thus, the SME device 304 may send the compressed data, Compressed Data1, to the target 106 in association with the first write command at 332, 336, 340. Upon receiving a status from the target 106 in association with the first write command as shown at 346, the SME device 304 may determine from the status whether the write to the target 106 was successful. If the write was successful, the SME device 304 may merely drop the status. However, if the write was unsuccessful, the SME device 304 may drop the status and re-send the data to the target 106. Alternatively, it may be desirable to send the status to the host 102 so that the host 102 will re-send the data to the SME device 304.

While the SME device 304 completes processing in association with the first write command (e.g., via one of a plurality of processors), the SME device 304 may perform processing in association with the second write command (e.g., via another one of the plurality of processors). As shown in this example, the SME device 304 may compress and/or encrypt the data, Data2, sent in association with the second write command as shown at 344. The SME device 304 may send a second write command, WRITE_CMD2, to the target 106 at 348. Since the data, Data2, has been compressed, the size specified as a parameter to the write command will be less than the size specified by the host at 322. The SME device 304 may receive a transfer ready, XFR_RDY, from the target 106 as shown at 350. The SME device 304 may thereafter send the compressed data, Compressed Data2, as shown at 352, 354, 356 to the target 106. The target 106 may then send a status at 358 to the SME device 304.

As described above with reference to FIG. 3, the disclosed embodiments enable a host to send multiple, sequential write commands without perceiving a substantial delay typically introduced in systems implementing compression and/or encryption. In accordance with various embodiments, this is accomplished through an SME device that is capable of simultaneously performing processing for two or more write commands, which may be sent by the same host. This may be accomplished through the use of multiple processors, as will be described in further detail below.

Figure 4:
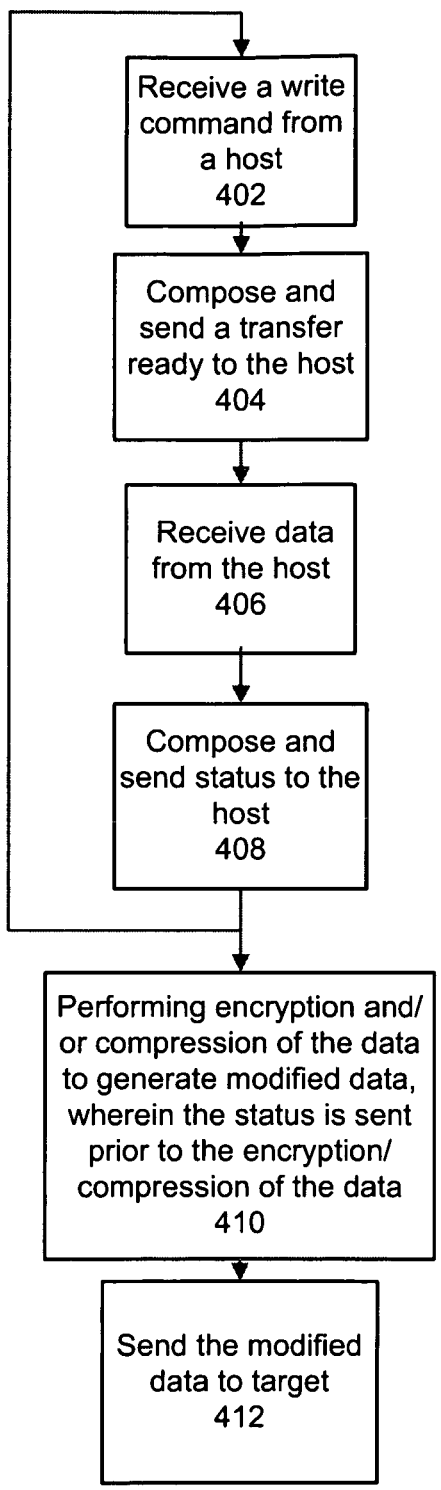
FIG. 4 is a process flow diagram illustrating an example general method of performing storage media encryption and/or compression with write acceleration in accordance with various embodiments.

FIG. 4 is a process flow diagram illustrating an example general method of performing storage media encryption and/or compression with write acceleration in accordance with various embodiments. The SME device may receive a write command from a host at 402. The SME device may then compose and send a response such as a transfer ready to the network device in response to the write command at 404. The SME device may receive data from the host at 406 in the form of one or more data frames. The SME device may buffer the data until all data transmitted in association with the write command has been received. The SME device may then compose a status and send the status to the host at 408 after the data has been received from the host. The status may be sent to the host prior to performing compression and/or encryption of the data (e.g., before initiation and/or completion of the compression and/or encryption). Thus, although the status sent to the network device indicates that the write command has been successfully completed (e.g., the target has successfully received the data), the data has not yet been processed or transmitted to the target.

The SME device may perform encryption and/or compression of the data to generate modified data at 410. Compression of the data may be performed via an Application Specific Integrated Circuit configured for performing compression of data. Encryption of compressed or uncompressed data may be performed by a processor (e.g., via processing software instructions). Specifically, where the SME device includes a plurality of processors, the compressed (or uncompressed) data may be encrypted by one of the plurality of processors. In other embodiments, compression of data may be performed via the same processor that performs the encryption. The SME device may then send the modified data to a target at 412 indicated by the write command. The target may be identified directly or indirectly in the write command received from the host. Specifically, the write command may specifically identify the target to which the data is being written. Alternatively, where the SME device implements virtualization of storage, the SME device may perform a virtual-physical mapping in order to identify the target(s) based upon a virtual storage identifier provided in the write command.

Upon receiving a status from the target, the SME device may drop the status. Where the status indicates that an error has occurred, the SME device may re-send the data to the target without notifying the host of the error, where possible. Alternatively, the SME device may send the status to the host so that the host may re-send the data to the SME device.

Where an error occurs during an accelerated write, the SME device may send a Deferred Check Condition indication to the host on future I/O. Hosts and backup applications may, for example, perform a large number of writes followed by Write File Marks. Hence, the Deferred Check Condition may be sent to the host in response to either a Write or a Write File Mark, depending on the positioning of the error for an accelerated write.

There may be situations in which the logic device(s) performing the data compression and/or encryption processing cannot keep up with the host write commands. This may result in buffer underflow. To avoid such problems, in some implementations the SME write acceleration service may be stopped after certain outstanding writes. For example, the limit may be tunable according to, e.g., an optimum throughput of the logic device(s) performing the data compression and/or encryption processing with regard to the processing latencies and maximum host ingress rate.

In addition, SCSI position modification commands may be pended till the SME write accelerated commands are completed. If so, this procedure may ensure that a consistent image is provided to the host.

It is important to note that the since the SME device composed and sent a status to the host prior to receiving a status from the target, the host perceives there to be no delay introduced by the SME device. Thus, after the SME device sends the status to the host, the host may send an additional write command. In other words, this additional write command may be received prior to completion of processing (e.g., compression and/or encryption) with respect to the prior write command (and therefore prior to receiving a status from the target with respect to the prior write command). Processing associated with this additional write command may then proceed at 402-412, as described above. It is important to note that steps 410 and 412 may be performed with respect to a prior write command simultaneously with the processing of the additional, subsequent write command. As a result, the host will not perceive a delay resulting from the compression or encryption performed by the SME device at 410.

Figure 5:
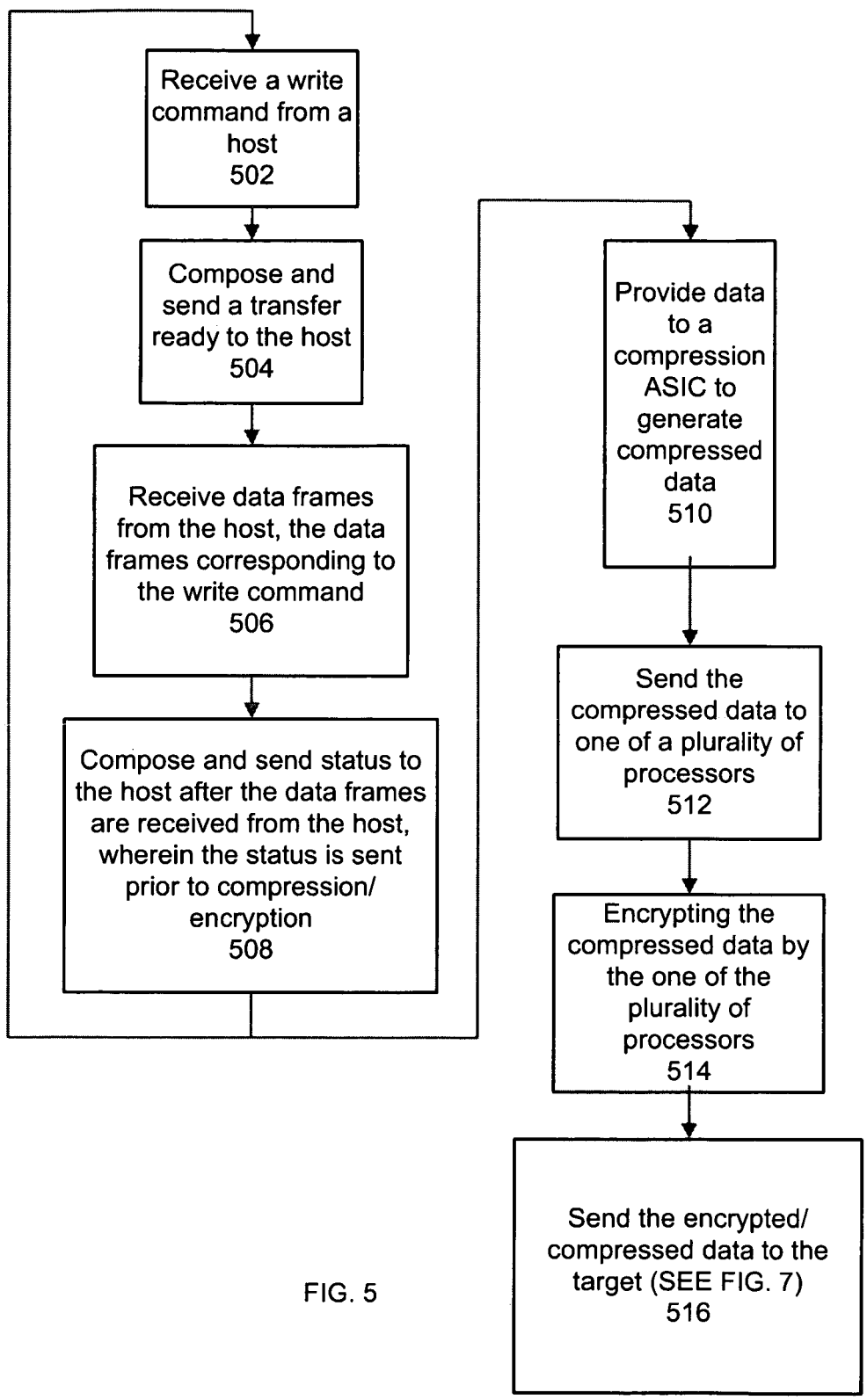
FIG. 5 is a process flow diagram illustrating an example method of performing storage media compression and encryption with write acceleration via an apparatus having a plurality of processors in accordance with various embodiments.

FIG. 5 is a process flow diagram illustrating an example method of performing storage media compression and encryption with write acceleration via an SME device having a plurality of processors in accordance with various embodiments. The SME device may receive a write command from a host at 502. The SME device may then compose and send a transfer ready to the host at 504 in response to the write command. The SME device may receive data (e.g., data frames) from the host at 506, where the data corresponds to the write command. The SME device may buffer the data until all data transmitted in association with the write command has been received.

The SME device may compose a status and send the status to the host at 508 after the data has been received. The SME device may send the status to the host after the data has been received from the host, but prior to compression and/or encryption of the data. More specifically, the SME device may send the status to the host prior to initiating compression of the data and/or prior to initiating encryption of the data. Alternatively, the SME device may simply send the status prior to completion of the compression and/or prior to completion of the encryption of the data.

The SME device may compress the data to generate compressed data. Specifically, the SME device may provide the data to a compression Application Specific Integrated Circuit (ASIC) that is configured to perform data compression at 510 such that compressed data is generated. The SME device may then provide the compressed data to one of the plurality of processors (e.g., a processor that is not currently in use) at 512, enabling the one of the plurality of processors to encrypt the compressed data at 514.

In other embodiments, the data may be encrypted without being compressed. Thus, the SME device may provide the data to one of the plurality of processors (e.g., a processor that is not currently encrypting data). The processor may then encrypt the data. The result of the encryption of the compressed (or uncompressed) data by one of the plurality of processors may be referred to as modified data.

In one embodiment, the data frames that are received are buffered until all of the data frames associated with a logical data block are received. The buffering of data frames enables a large amount of data to be compressed. Since there may be redundancy in the data frames, the compression ratio may be improved as the amount of data in the logical data block being compressed is increased. Compression may be performed on the logical data block to generate compressed data. Encryption may then be performed on the compressed data associated with the logical data block. After encryption has been performed on the compressed data, the result for the logical data block may be segmented into multiple data frames such that modified data is generated. A cyclic redundancy check (CRC) value may also be re-computed for the modified data and appended to one of the data frames.

In another embodiment, all data frames associated with a logical data block need not be received and buffered in order to initiate compression and/or encryption of data in the logical data block. Thus, the compression and/or encryption process may be initiated well before all of the data associated with a logical data block or write command has been received from the host. Accordingly, encryption and/or encryption may be initiated and performed while data frames are still being received in association with a particular logical block or write command.

Once compressed (or uncompressed) data has been encrypted, the SME device may then send the modified data (e.g., in the form of one or more data frames) to one or more targets at 516. One method of sending the modified data to a target will be described in further detail below with reference to FIG. 7.

When the target has received the data, the target may send a status to the SME device. However, the SME device has already sent a status to the host before actually receiving the status from the target. Since the SME device has already sent a status to the host, the SME device may drop the status that it has received from the target.

It is important to note that after the status has been sent to the host at 508, the host may continue to send additional write commands, which may be processed at 502. As a result, while data associated with a write command is being compressed/encrypted, data associated with a subsequent write command may be transmitted by the host. Since the data associated with multiple write commands may be simultaneously processed (e.g., encrypted) by different processors, the disclosed embodiments eliminate the delay that typically results from encryption of the data.

FIG. 6 is a block diagram illustrating an example data structure that may be used to track the status of tasks being processed by a plurality of processors in accordance with various embodiments. In this example, the data structure is a queue that indicates the status of various host tasks being processed by the SME device. Specifically, the SME device may maintain a queue of host tasks such as write commands being processed by the plurality of processors. The queue may indicate a status 602 of each of the write commands (e.g., tasks), as shown. In addition, the queue may indicate which one of the plurality of processors is processing the corresponding write command. The queue may be implemented via a variety of data structures, such as a linked list or array.

The SME device may set a corresponding indicator in the queue to indicate that processing of a write command is completed. The SME device may consider the processing of the write command to be completed if the modified data has been generated. In some embodiments, the SME device may not consider the processing of the write command to be completed until a transfer ready command has been received from the target (e.g., for that particular write command). The SME device may indicate that the processing of the write command is completed by setting the status 602 of the corresponding write command to indicate that the task is "Done." As shown in this example, the status of each write command that is being processed may be initialized to "Pending." Although different I/Os may be completed at different times, the SME device may send data to the target in the same order in which it received the data from the initiator(s). The order in which the SME device sends data to the target may vary with the type of I/O, as well as the type of the target.

Figure 7:
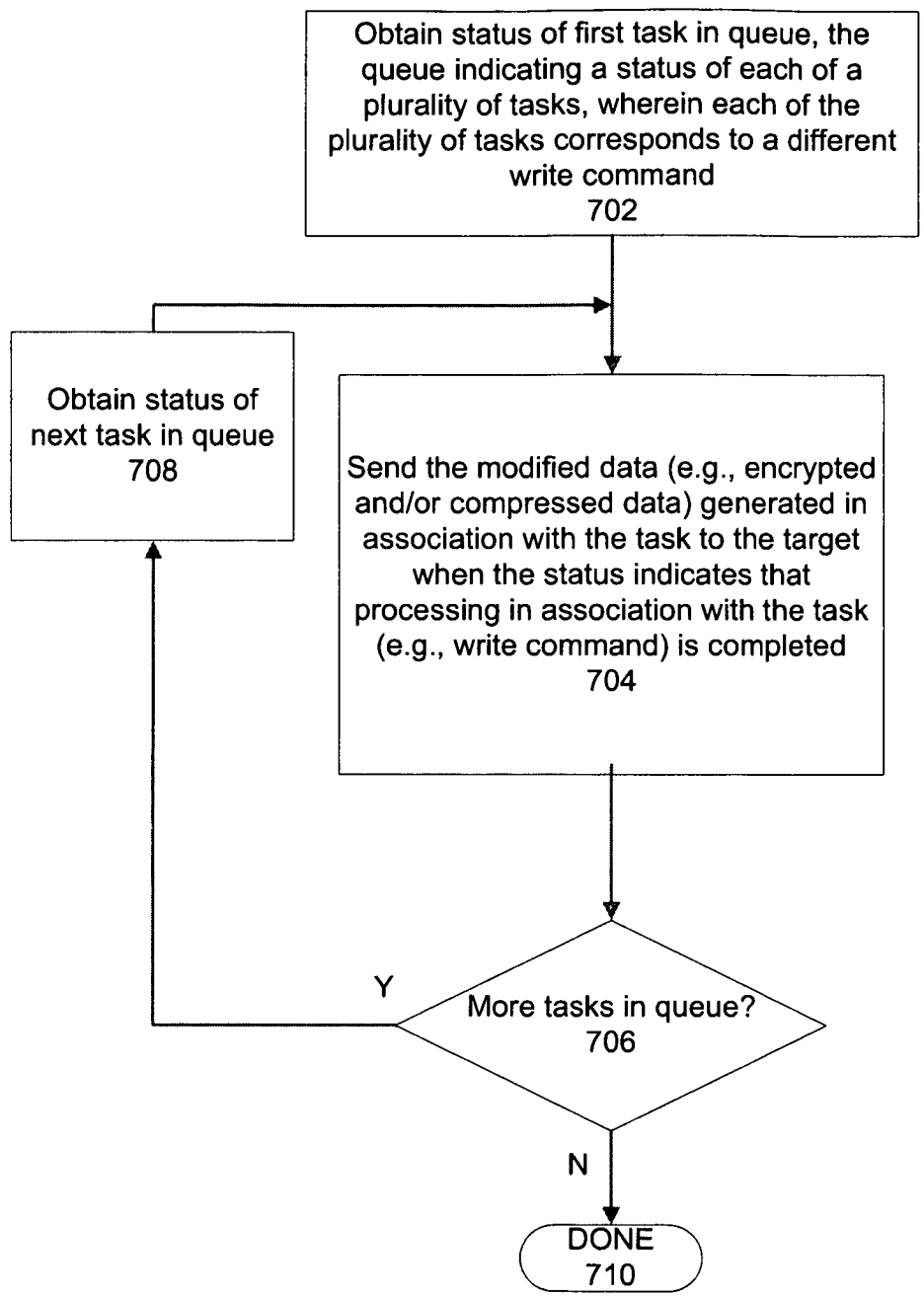
FIG. 7 is a process flow diagram illustrating a method of transmitting compressed and/or encrypted data to a target as shown at 516 of FIG. 5 in accordance with various embodiments.

FIG. 7 is a process flow diagram illustrating a method of transmitting compressed and/or encrypted data to a target as shown at 516 of FIG. 5 in accordance with various embodiments. In one embodiment, the SME device may send the modified data to a target indicated by the write command if a queue such as that shown in FIG. 6 indicates that processing of the write command is completed and the write command is the next write command in the queue. In this example, the SME device obtains a status of the first task (e.g, write command) represented in the queue at 702. The SME device may send the modified data (compressed and/or encrypted data) generated in association with the write command to the target at 704 if the status indicates that processing in association with the write command is completed. If there are more tasks in the queue at 706, the SME device may obtain the status of the next task in the queue at 708. The process may continue at 704 to send modified data that has been generated in association with write commands to the target, where the modified data is sent in the order that the write commands have been received by the SME device. When no tasks in the queue remain, the process may end at 710.

The embodiment described with reference to FIG. 7 implements polling to ascertain the status of tasks represented in the queue. Thus, the SME device may poll the status of the next task in the queue until the status indicates that processing is completed. In other embodiments, a signal may be generated upon completion of a task in the queue so that polling of the queue need not be performed.

The disclosed embodiments may substantially reduce the latency due to encryption and compression. Hosts may be able to store data to storage media in an efficient and secure manner with little or no performance cost. Moreover, where the SME process compresses the data prior to its encryption, the target I/O latencies may be minimized. In this manner, hosts may obtain more bandwidth.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including Fibre Channel interfaces, for example. Specific examples of such network devices include routers and switches. A general architecture for some of these machines will appear from the description given below. Further, various embodiments may be at least partially implemented on a card (e.g., an interface card) for a network device or a general-purpose computing device.

Figure 8:
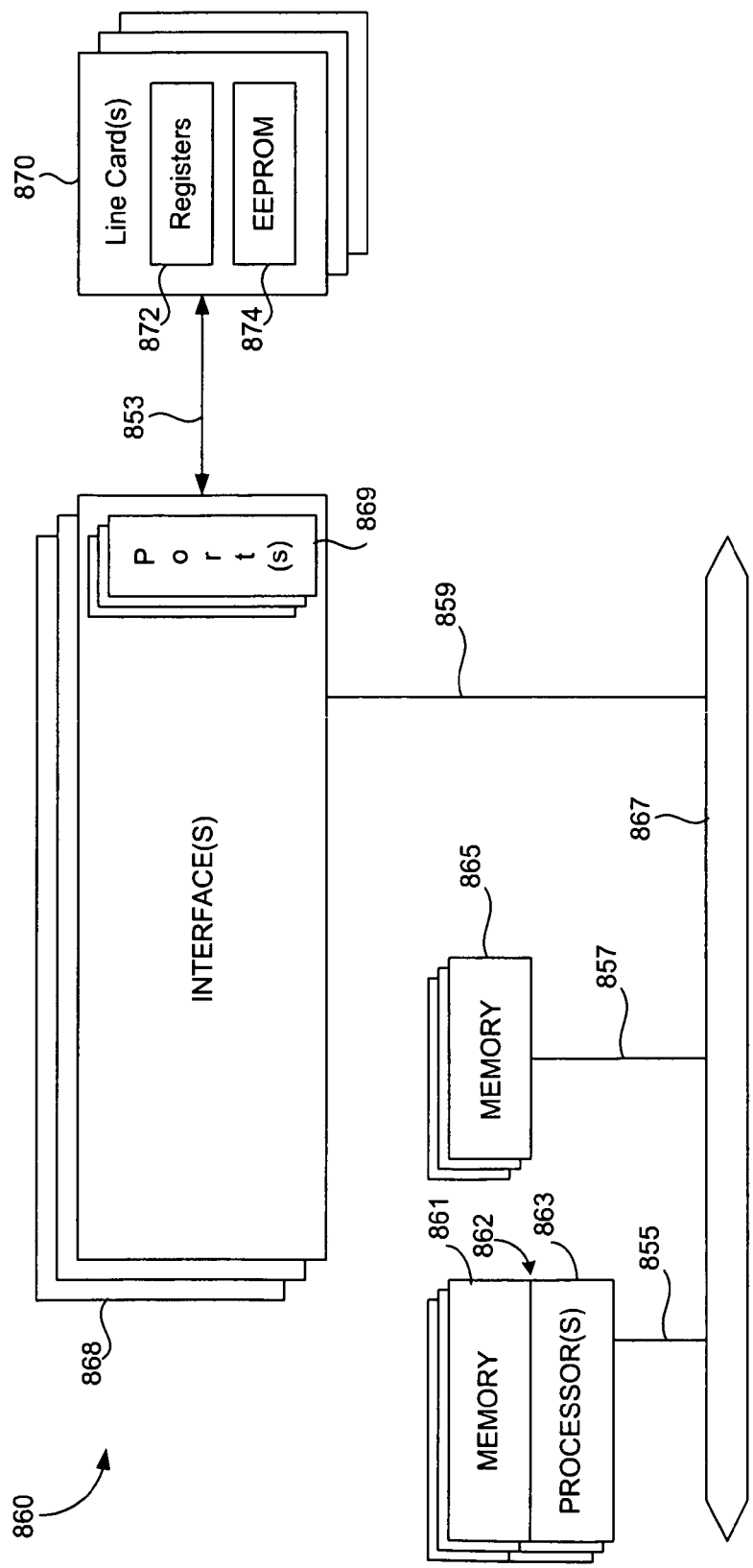
FIG. 8 is a diagrammatic representation of an example network device in which various embodiments may be implemented.

The disclosed embodiments may be implemented at network devices such as switches or routers. Referring now to FIG. 8, a router or switch 810 suitable for implementing embodiments of the invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It may also be responsible for implementing the disclosed embodiments, in whole or in part. The router may accomplish these functions under the control of software including an operating system (e.g., the Nexus Operating System (NX-OS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets or data segments over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as Fibre Channel interfaces, fast Ethernet interfaces, Gigabit Ethernet interfaces, POS interfaces, LAN interfaces, WAN interfaces, metropolitan area network (MAN) interfaces and the like. Generally, these interfaces may include ports appropriate for communication with the appropriate media. In some cases, they may also include one or more independent processors and, in some instances, volatile RAM. The independent processors may control such communications intensive tasks as packet switching, media control and management, as well as compression and/or encryption, as described herein. By providing separate processors for the communications intensive tasks, these interfaces allow the master microprocessor 862 to efficiently perform routing computations, network diagnostics, security functions, etc. Although the system shown in FIG. 8 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   receiving a write command from a network device, wherein the write command corresponds to a particular task;
   composing and sending a transfer ready to the network device in response to the write command;
   receiving data from the network device;

composing a status and sending the status to the network device, the status indicating that the write to a target indicated by the write command was successful;
performing at least one of encryption or compression of the data to generate modified data; and
sending the modified data to the target indicated by the write command, wherein the modified data is sent to the target when a task status associated with the particular task indicates that processing in association with the particular task is completed;
wherein the status is sent to the network device after the data has been received from the network device and prior to completion of performing at least one of encryption or compression of the data, wherein the status is sent to the network device prior to receiving a status from the target;
wherein performing at least one of encryption or compression of the data to generate modified data is initiated before all data sent via the write command has been received.

2. The method as recited in claim 1, wherein the target is identified in the write command.

3. The method as recited in claim 1, wherein performing at least one of encryption or compression of the data to generate the modified data comprises:
providing the data to an Application Specific Integrated Circuit (ASIC) configured to perform data compression such that compressed data is generated;
providing the compressed data to one of a plurality of processors; and
encrypting the compressed data by the one of the plurality of processors to generate the modified data.

4. The method as recited in claim 1, wherein performing at least one of encryption or compression of the data to generate the modified data comprises:
providing the data to an Application Specific Integrated Circuit (ASIC) configured to perform data compression such that compressed data is generated.

5. The method as recited in claim 1, wherein performing at least one of encryption or compression of the data to generate the modified data comprises:
providing the data to one of a plurality of processors; and
encrypting the data by the one of the plurality of processors to generate the modified data.

6. The method as recited in claim 1, where performing at least one of encryption or compression of the data to generate modified data comprises:
compressing the data such that compressed data is generated;
providing the compressed data to one of a plurality of processors; and
encrypting the compressed data by the one of the plurality of processors to generate the modified data.

7. The method as recited in claim 6, further comprising:
receiving a second write command prior to completion of encrypting the compressed data.

8. The method as recited in claim 7, wherein the second write command is received prior to receiving a status from the target.

9. The apparatus as recited in claim 1, wherein the data received includes a plurality of data frames, the method further comprising:
buffering the plurality of data frames prior to performing at least one of encryption or compression of the data.

10. The method as recited in claim 1,
wherein the receiving a write command and composing and sending a transfer ready is performed by a second device; and
wherein the receiving data, composing a status and sending the status, performing at least one of encryption or compression, and sending steps are performed by a third second network device.

11. The method as recited in claim 1, further comprising:
prior to sending the modified data, obtaining the task status of the particular task from a queue, the queue indicating the task status of each of a plurality of tasks, wherein each of the plurality of tasks corresponds to a different write command;
wherein the plurality of tasks includes the particular task corresponding to the write command.

12. An apparatus, comprising:
a plurality of processors; and
a memory, the plurality of processors and the memory being adapted configured for:
receiving a write command from a network device, wherein the write command corresponds to a particular task;
sending a transfer ready to the network device in response to the write command;
receiving data from the network device;
composing a status and sending the status to the network device;
compressing the data to generate compressed data;
encrypting the compressed data by one of the plurality of processors to generate modified data; and
sending the modified data to a target indicated by the write command, wherein the modified data is sent to the target when a task status associated with the particular task indicates that processing in association with the particular task is completed;
wherein the status is sent to the network device after the data has been received from the network device and prior to both compressing and encrypting the data, the status indicating that the write to the target was successful, wherein the status is sent to the network device prior to receiving a status from the target;
wherein compressing the data or encrypting the compressed data to generate modified data is initiated before all data sent via the write command has been received.

13. The apparatus as recited in claim 12, the plurality of processors and the memory being further adapted configured for:
receiving an additional write command from the network device;
sending a transfer ready to the network device in response to the additional write command;
receiving additional data from the network device that corresponds to the additional write command;
sending an additional status to the network device;
compressing the additional data to generate additional compressed data; and
encrypting the additional compressed data by another one of the plurality of processors to generate additional modified data.

14. The apparatus as recited in claim 13, wherein the additional status is sent to the network device after the additional data has been received from the network device and prior to both compressing and encrypting the additional data.

15. The apparatus as recited in claim 12, wherein compressing is initiated before all data sent in association with the write command has been received.

16. The apparatus as recited in claim 12, wherein the data received includes a plurality of data frames, the plurality of processors and the memory being further configured adapted for:

buffering the plurality of data frames by the one of the plurality of processors prior to compressing the data.

17. The apparatus as recited in claim 12, wherein encrypting the compressed data to generate modified data is initiated before all data sent via the write command has been received.

18. A non-transitory computer-readable medium storing thereon computer-readable instructions, comprising:

instructions for composing and sending a status to a network device after data associated with a write command has been received from the network device that has initiated the write command;

instructions for encrypting by one of a plurality of processors the data or compressed data generated from compression of the data such that modified data is generated by the one of the plurality of processors;

instructions for maintaining a queue of write commands being processed by the plurality of processors, wherein the queue of write commands includes the write command; and instructions for sending the modified data to a target indicated by the write command when a task status associated with the write command in the queue indicates that processing of the write command is completed;

wherein the status is sent to the network device prior to completion of encryption by the one of the plurality of processors, the status indicating that the write to the target was successful, wherein the status is sent to the network device prior to receiving a status from the target.

19. The non-transitory computer-readable medium as recited in claim 18, wherein the queue indicates that processing of the write command is completed if the modified data has been generated.

20. The non-transitory computer-readable medium as recited in claim 18, wherein the queue indicates that processing of the write command is completed if the modified data has been generated and a transfer ready has been received from the target.

21. The non-transitory computer-readable medium as recited in claim 18, further comprising:

instructions for dropping a status received from the target, wherein the status is sent to the network device prior to receiving the status from the target.

22. The non-transitory computer-readable medium as recited in claim 18, wherein the status sent to the network device indicates that the write command has been successfully completed.

23. The non-transitory computer-readable medium as recited in claim 22, further comprising:

instructions for providing the compressed data to the one of the plurality of processors.

24. The non-transitory computer-readable medium as recited in claim 22, wherein the instructions for initiating compression of the data comprise:

instructions for providing the data to an Application Specific Integrated Circuit (ASIC) configured to perform data compression.

25. The non-transitory computer-readable medium as recited in claim 22, wherein the instructions for selecting one of a plurality of processors to perform encryption of the data or compressed data generated from compression of the data such that modified data is generated by the one of the plurality of processors comprises:

selecting one of the plurality of processors to perform encryption of the compressed data.

26. The non-transitory computer-readable medium as recited in claim 18, wherein the queue further indicates the task status of each of the commands, further comprising:

instructions for obtaining the task status of a next one of the commands in the queue.

\* \* \* \* \*